(12) United States Patent
Furukawa (10) Patent No.: US 11,314,727 B2
(45) Date of Patent: Apr. 26, 2022

(54) BLOCKCHAIN MANAGEMENT APPARATUS, BLOCKCHAIN MANAGEMENT METHOD, AND PROGRAM

(71) Applicant: NEC CORPORATION, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 91 days.

(21) Appl. No.: 16/640,874

(22) PCT Filed: Aug. 22, 2017

(86) PCT No.: PCT/JP2017/029998
§ 371 (c)(1),
(2) Date: Feb. 21, 2020

(87) PCT Pub. No.: WO2019/038839
PCT Pub. Date: Feb. 28, 2019

(65) Prior Publication Data
US 2020/0356547 A1 Nov. 12, 2020

(51) Int. Cl.
*G06F 7/00* (2006.01)
*G06F 17/00* (2019.01)
*G06F 16/23* (2019.01)

(52) U.S. Cl.
CPC ...... *G06F 16/2379* (2019.01); *G06F 16/2365* (2019.01)

(58) Field of Classification Search
None
See application file for complete search history.

(56) References Cited

U.S. PATENT DOCUMENTS

2016/0253622 A1\* 9/2016 Sriram ................. H04L 63/126
713/179
2017/0039330 A1\* 2/2017 Tanner, Jr ............. G16H 10/60
(Continued)

FOREIGN PATENT DOCUMENTS

JP 2016-218633 A 12/2016
JP 2017-049967 A 3/2017
(Continued)

OTHER PUBLICATIONS

Satoshi Nakamoto, "Bitcoin: A Peer-to-Peer Electronic Cash System", 2008, pp. 1-9.
(Continued)

*Primary Examiner* — Tuan A Pham (57) ABSTRACT

A blockchain management apparatus includes a block receiving part that receives a block including a block header that includes a hash value for reference information selected from a predetermined range in a ledger based on a predetermined rule established between blockchain management apparatuses; a block verification part that selects the reference information from the predetermined range in the ledger based on the predetermined rule and determines whether or not the hash value for the reference information included in the block has been generated based on the reference information, to verify that the block has been correctly generated; a consensus formation part that, if the block verification part verifies that the block has been correctly generated, forms a consensus with other blockchain management apparatuses to write the block to the ledger; and a ledger storage part that stores the block for which the consensus has been formed.

16 Claims, 10 Drawing Sheets

(56) References Cited

U.S. PATENT DOCUMENTS

| | | | |
|---|---|---|---|
| 2017/0046698 A1* | 2/2017 | Haldenby | G06Q 20/4016 |
| 2017/0075941 A1* | 3/2017 | Finlow-Bates | H04L 9/3239 |
| 2017/0083911 A1 | 3/2017 | Phillips | |
| 2017/0193619 A1* | 7/2017 | Rollins | G06Q 10/101 |
| 2018/0205555 A1 | 7/2018 | Watanabe et al. | |
| 2018/0241551 A1 | 8/2018 | Fujimura et al. | |
| 2018/0323964 A1 | 11/2018 | Watanabe et al. | |
| 2019/0058590 A1 | 2/2019 | Watanabe et al. | |

FOREIGN PATENT DOCUMENTS

| | | | |
|---|---|---|---|
| JP | 2017-050763 A | 3/2017 | |
| JP | 2017-091148 A | 5/2017 | |
| JP | 2017-091149 A | 5/2017 | |
| WO | 2017/010455 A1 | 1/2017 | |

OTHER PUBLICATIONS

Yasuyuki Fuchita, "Inovation to Kin'yu", Nomura Capital Market Quarterly, 2015 Autumn, Nov. 1, 2015, pp. 11-35, vol. 19, No. 2.
Florian Tschorsch et al., "Bitcoin and Beyond: A Technical Survey on Decentralized Digital Currencies", IEEE Communications Surveys & Tutorials, Third Quarter 2016, pp. 2084-2123, vol. 18, No. 3.
International Search Report for PCT/JP2017/029998, dated Nov. 21, 2017.

* cited by examiner

| BLOCK HEIGHT | BLOCK |
|---|---|
| ... | ... |
| 294 | BLOCK HEADER<br><br>Hash:000000000000000000000000000000000000000000000000000054390876aaabcdef<br><br>Nonce:345698380219<br><br>REFERENCE INFORMATION HASH VALUE:<br>678e82d907d3e6e71f81D5cf3ddacc3671dc618c38a1b7a9f9393a83d025b296<br><br>TRANSACTION200 |
| ... | ... |
| 500 | BLOCK HEADER<br><br>Hash:0000000000000000000000000000000000000000000000000000004440abdfee432900<br><br>Nonce:234509867345<br><br>REFERENCE INFORMATION HASH VALUE:<br>e1c10806027637577653A25120e4a8437be5207c2e250181823a4fc323eaee39<br><br>TRANSACTION999 |
| 501 | BLOCK HEADER<br><br>Hash:000000000000000000000000000000000000000000000000000003cde578641109efd<br><br>Nonce:123489023484<br><br>REFERENCE INFORMATION HASH VALUE:<br>678e82d907d3e6e71f81D5cf3ddacc3671dc618c38a1b7a9f9393a83d025b296<br><br>TRANSACTION1000<br><br>TRANSACTION1001<br><br>TRANSACTION1002 |

BLOCKCHAIN MANAGEMENT APPARATUS, BLOCKCHAIN MANAGEMENT METHOD, AND PROGRAM

CROSS REFERENCE TO RELATED APPLICATIONS

This application is a National Stage of International Application No. PCT/JP2017/029998 filed Aug. 22, 2017.

FIELD

The present disclosure relates to a blockchain management apparatus, a blockchain management method and a program, and relates to a blockchain management apparatus, a blockchain management method and a program that manage a ledger shared among a plurality of nodes participating in a network.

BACKGROUND

In recent years, in a Peer to Peer (P2P) network in which anyone can participate without the need for a centrally managed server, as represented by Bitcoin (refer to Non-Patent Literature (NPL) 1), there has been increasing popularization in blockchain where ledgers shared among all nodes participating in the network can be managed.

Blockchain as represented by Bitcoin is a system in which a plurality of blockchain management nodes (blockchain management apparatuses) are connected to one another. A blockchain management node is provided with a ledger storage means, a transaction verification means and a consensus formation means. The ledger storage means stores transactions issued by a transaction issuer that issues record information (referred to below as "transaction") to be stored in a blockchain. The transaction verification means verifies transactions. The consensus formation means performs processing (called "consensus formation"; also known as "mining") to make identical the content of transactions stored among the blockchain management nodes. The transactions stored in the ledger storage means, with a unit in which one or a plurality of transactions are aggregated as a data structure being a block, are characterized by including a block header that includes a hash value of at least the previous block, among the blocks in question. An aggregation of blocks stored in this way is called a ledger.

An outline of how the blockchain operates is given below. Each blockchain management node receives one or a plurality of transaction information items issued by one or a plurality of transaction issuers. The transaction verification means performs verification of the received one or plurality of transaction information items, and aggregates at least one transaction that has passed the verification to form a block. Block content may differ with each blockchain management node. Thus, the consensus formation means makes identical the content of transactions stored among the blockchain management nodes. The blocks made identical in the respective blockchain management nodes by the consensus formation means are stored in a ledger storage means.

In this arrangement there is an incentive provided where the blockchain management nodes receive transactions and correctly generate and store blocks. For example, with Bitcoin, by generating blocks, a blockchain management node can obtain a virtual currency. As a result, the behavior is such that many blockchain management nodes correctly perform verification and generation of blocks.

By this type of configuration and operation, even in a case where a malicious node participates as a blockchain management node, falsification is difficult, and content of ledgers at respective blockchain management nodes is identical, with transactions being stored in the same order.

Since in blockchain there are multiple blockchain management nodes with the abovementioned configuration and operation, and all data is managed by being duplicated, in addition to data not being falsified, it is expected that data will not disappear. Using this quality of blockchain, a service emerges where data are recorded in the form of transactions and the blockchain is used as a database system.

Patent Literature (PTL) 1 discloses a virtual currency management program and a virtual currency management method in which it is possible to reduce processing capability and storage capacity of a terminal required in consensus formation (mining) that is described.

[PTL 1] Japanese Patent Kokai Publication No. JP2016-218633A

[NPL1] Satoshi Nakamoto, "Bitcoin: A Peer-to-Peer Electronic Cash System", 2008.

SUMMARY

The following analysis is given according to the present disclosure. In the abovementioned typical blockchain framework, in order to have an incentive, motivation for a blockchain management node to hold each transaction relates to generating new blocks and verifying transactions and blocks, and there is a tendency whereby motivation to hold extra data unnecessary for such processing becomes lower.

Existing blockchain technology as represented by Bitcoin does not get a hash value for an entire block but gets a hash value only for a block header and includes it in the next block. The block header principally includes a hash value of the immediately preceding block, and hash values generated based on all transactions included in the block. In this case, detailed information of respective transactions is not necessary in verification of hash values of block headers.

Transactions that have become old need not be held if not necessary for verification of new blocks and transactions. For example, with Bitcoin, a transaction includes input information specifying a plurality of coins to be used and output information representing a plurality of new coins generated by the transaction; in verifying a new transaction a necessary transaction is only a transaction in which an unused coin included in the output information remains; and in a case where all coins included in a transaction have been used, reference thereto is no longer done at a time of verification. With regard to this point, paragraph 0005 in Patent Literature 1 has a description: "in a terminal used in mining, it is necessary to store all transaction histories in the terminal itself", but in blockchain technology represented by the abovementioned Bitcoin there is no such necessity.

In other words, irrespective of the presence of a transaction unnecessary for verification of a hash of a block header in an existing blockchain and verification of a new block, since motivation for continuing to hold these transactions is not present at a blockchain management node, there is a possibility of some transactions being lost. With Bitcoin, a mode is implemented in which actually unnecessary transactions are discarded and ledger capacity can be reduced.

As a result, in a service used as a database system by recording data in the form of transactions in the blockchain, there is a possibility of data being lost so that the service cannot be provided.

In this way, in the blockchain described in the background technology, since the motivation for a blockchain management node to permanently hold a transaction included in a ledger is low, there is a problem of important data included in the ledger in the form of a transaction being lost. This may be a problem particularly for a service where the blockchain is used as a database system.

It is an object of the present disclosure to provide a blockchain management apparatus, a blockchain management method and program that can reduce the possibility of loss of important data included in a ledger in the form of a transaction at a blockchain management node.

According to a first aspect, the disclosure provides a blockchain management apparatus provided with a block receiving part configure to receive a block including a block header that includes at least one hash value for reference information that is selected from a predetermined range in a ledger based on a predetermined rule established among blockchain management apparatuses. The blockchain management apparatus is further provided with a block verification part configured to select the reference information from the predetermined range in the ledger based on the predetermined rule and verifies, by determining whether or not the hash value for the reference information included in the block has been generated based on the reference information, whether or not the block has been correctly generated. The blockchain management apparatus is further provided with a consensus formation part configured to, if the block verification part verifies that the block has been correctly generated, form a consensus with other blockchain management apparatuses in order to write the block to the ledger. The blockchain management apparatus is provided with a ledger storage part configured to store the block for which the consensus has been formed.

According to a second aspect, the disclosure provides a blockchain management method including: receiving a block including a block header that includes at least one hash value for reference information that is selected based on a predetermined rule from a predetermined range in a ledger; selecting reference information based on the predetermined rule from the predetermined range in the ledger and determining whether or not the hash value for the reference information included in the block has been generated based on the reference information, in order to verify that the block has been correctly generated; forming consensus, if the verification verifies that the block has been correctly generated, with other blockchain management apparatuses in order to write the block to the ledger; and storing the block for which the consensus has been formed. The present method is associated with a particular mechanism, which is a blockchain management apparatus that manages a shared ledger in collaboration with other blockchain management apparatuses.

According to a third aspect, the disclosure provides a computer program for realizing a function of the abovementioned blockchain management apparatus. It is to be noted that this program may be recorded on a computer-readable (non-transitory) storage medium. That is, the present disclosure may be embodied as a computer program product.

The meritorious effects of the present disclosure are summarized as follows.

According to the present disclosure, it is possible to reduce the possibility of loss of important data included in a ledger in the form of a transaction at a blockchain management node.

PREFERRED MODES

First, a description is given of an outline of an exemplary embodiment of the present disclosure, making reference to the drawings. It is to be noted that reference symbols in the drawings attached to this outline are added to respective elements for convenience as examples in order to aid understanding, and are not intended to limit the present disclosure to modes illustrated in the drawings. Connection lines between blocks in the diagrams referred to in the following description include both unidirectional or bidirectional. Unidirectional arrows schematically show flow of main signals (data), but do not exclude bidirectionality.

Figure 1:
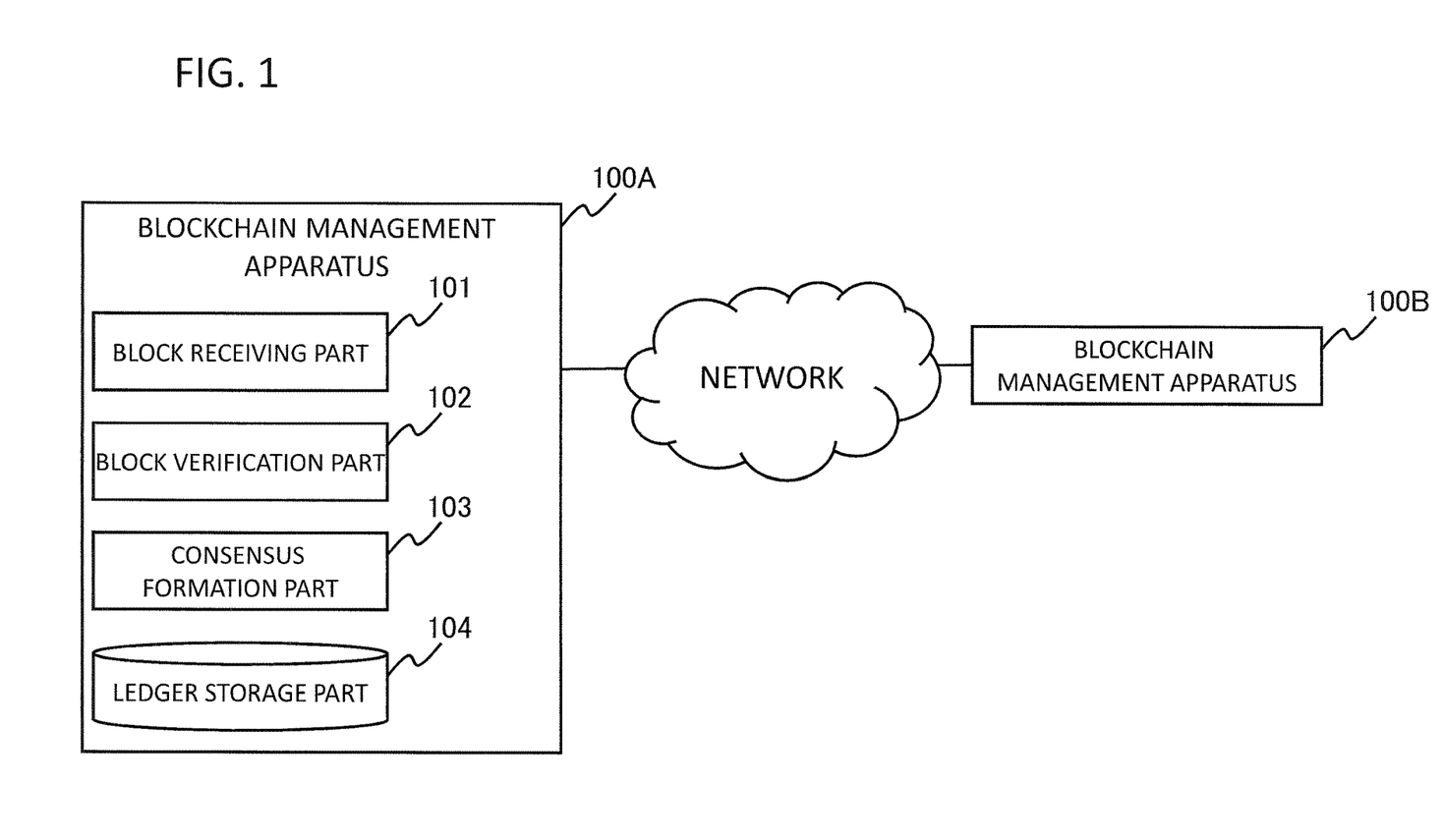
FIG. 1 is a diagram showing a configuration of an exemplary embodiment of the present disclosure.

The present disclosure, in an exemplary embodiment thereof as shown in FIG. 1, may be realized in a peer-to-peer connected configuration of a blockchain management apparatus 100A provided with a block receiving part 101, a block verification part 102, a consensus formation part 103, and a ledger storage part 104, and a blockchain management apparatus 100B having equivalent functions.

More specifically, the block receiving part 101 receives a block that includes a block header that includes at least one hash value for reference information that is selected from among a predetermined range in a ledger based on a predetermined rule established between blockchain management apparatuses, from other blockchain management apparatuses. The block verification part 102 selects the reference information from among the predetermined range in the ledger based on the predetermined rule and verifies, by determining whether or not the hash value for the reference information included in the block has been generated based on the reference information, whether the received block has been correctly generated. The consensus formation part 103, in a case where the block verification part 102 verifies that the block has been correctly generated, forms a consensus with other blockchain management apparatuses in order to write the block to the ledger. The ledger storage part 104 stores the block for which the consensus has been formed.

According to the abovementioned configuration, an incentive is given with regard to holding a transaction at a blockchain management node, and as many transactions as possible are held by a blockchain management node.

The reason for this may be analyzed as follows. In a case where a block includes a hash value for reference information that cannot be generated if reference information that is partial information of the ledger is not known, the block verification part 102 of the abovementioned blockchain management apparatus (for example, the blockchain management apparatus 100A) determines that the block is correct. Therefore, a certain blockchain management apparatus 100B must access arbitrary partial information of the ledger in order to generate a block. Meanwhile, in order to maximize incentives by block generation, preferably there are few nodes that can generate a block. From the above, it is difficult for a blockchain management apparatus that does not have ledger information adequate for generating a block to obtain reference information from another blockchain management apparatus, and the respective blockchain management apparatuses hold as much information as possible in the ledger. As a result, more transactions are held.

First Exemplary Embodiment

Figure 2:
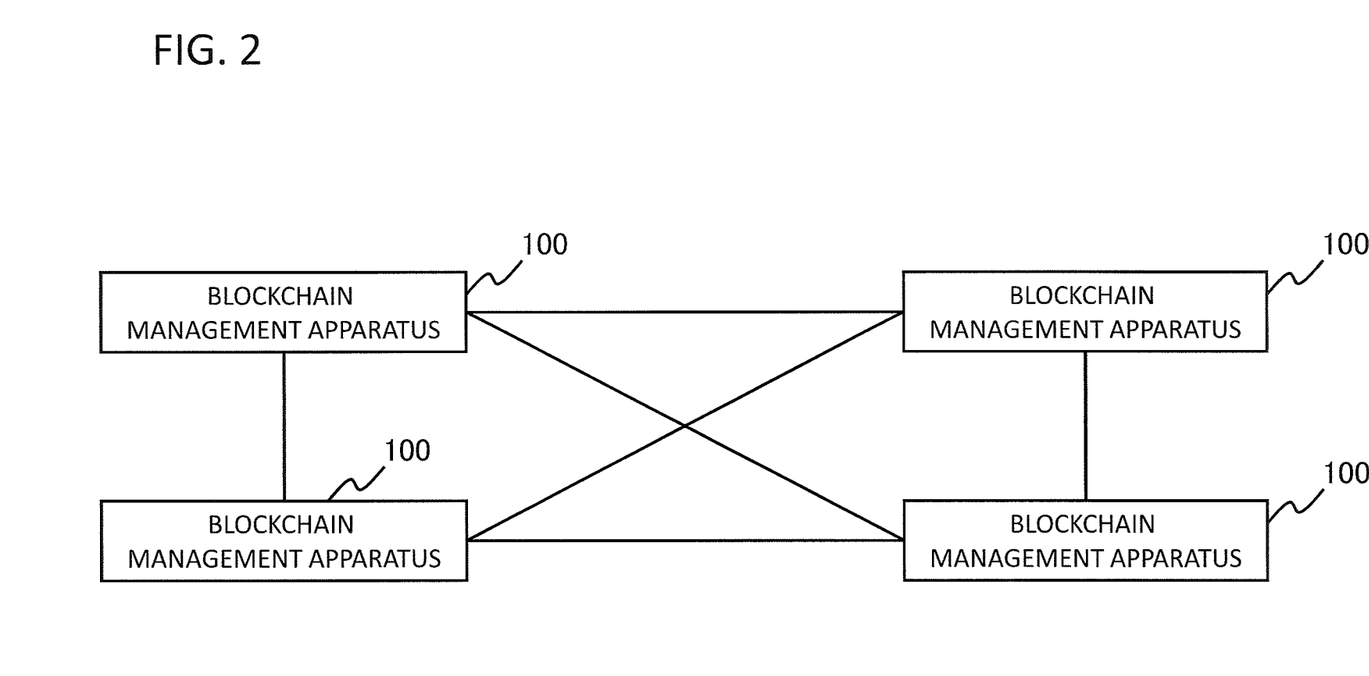
FIG. 2 is a diagram showing an overall configuration of a first exemplary embodiment of the present disclosure.

Next, a detailed description is given concerning a first exemplary embodiment of the present disclosure, making reference to the drawings. FIG. 2 is a diagram showing a configuration of the first exemplary embodiment of the present disclosure. FIG. 2 shows a configuration in which 4 blockchain management apparatuses (blockchain management nodes) 100 are connected to each other. These blockchain management apparatuses 100 verify transactions received from a transaction issuer. Transactions that pass the verification are aggregated to form a block. The blockchain management apparatus 100 that has created the block distributes the created block to other blockchain management apparatuses 100. On verifying the correctness thereof, the respective blockchain management apparatuses 100 add block content to a ledger. It is to be noted that in the abovementioned process, since the blockchain management apparatuses 100 may be a block creation agent, a block with different content may be created. In a case where a malicious blockchain management apparatus 100 exists, there is a possibility of a fraudulent block being created and distributed. In this case, a procedure known as consensus formation is performed, and contents of blocks stored among the blockchain management nodes 100 are made identical. Thus, ledger consistency is preserved. It is to be noted that in the example of FIG. 2, 4 blockchain management apparatuses are illustrated, but it is sufficient if there are plural blockchain management apparatuses, and there is no limitation to the configuration of FIG. 2.

Figure 3:
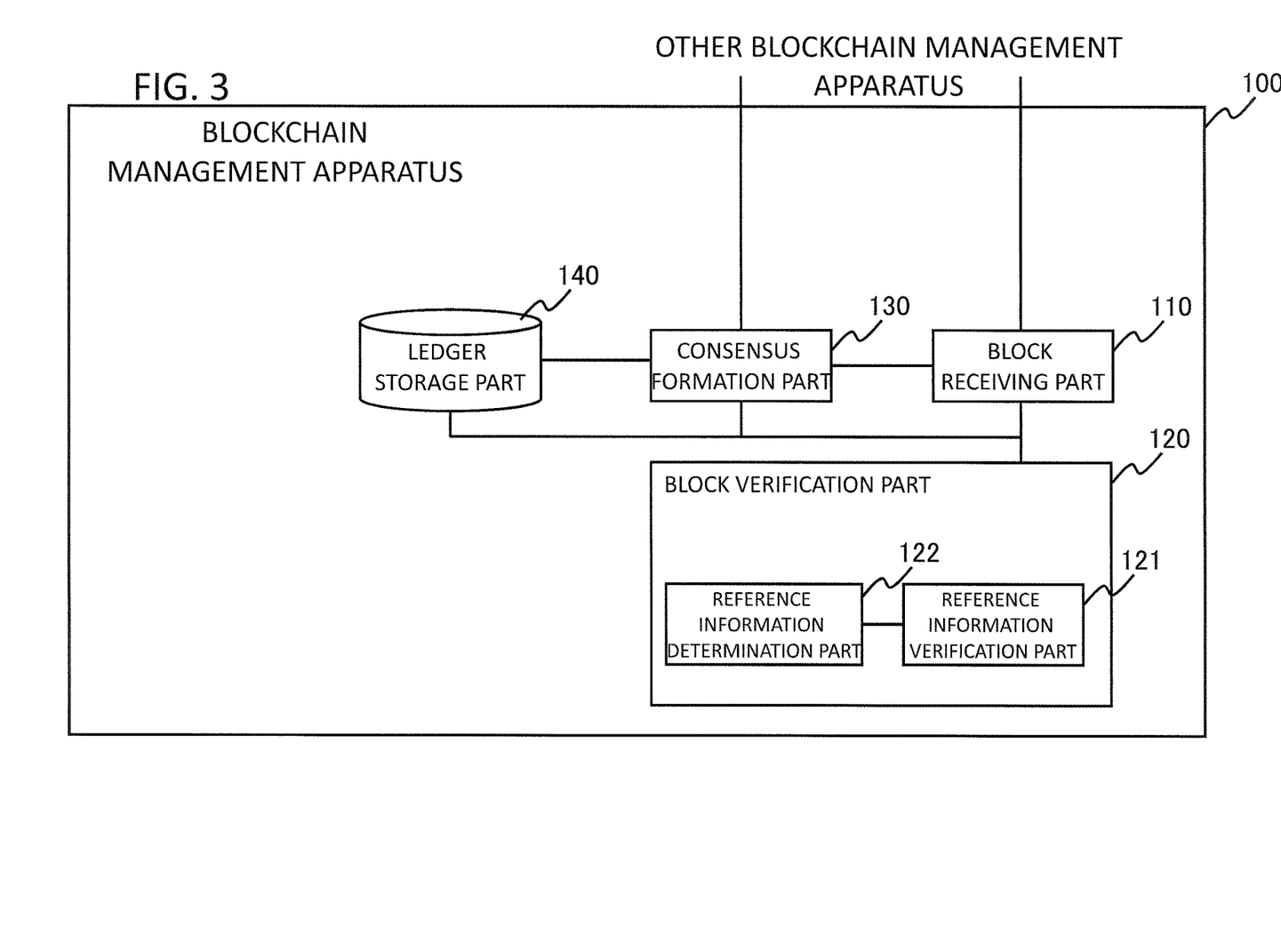
FIG. 3 is a functional block diagram showing a configuration of a blockchain management apparatus in the first exemplary embodiment of the disclosure.

Continuing, a detailed description is given concerning a configuration of a blockchain management apparatus 100, making reference to the drawings. FIG. 3 is a functional block diagram showing a configuration of the blockchain management apparatus in the first exemplary embodiment of the disclosure. FIG. 3 shows the blockchain management apparatus 100 that includes a block receiving part 110, a block verification part 120, a consensus formation part 130, and a ledger storage part 140.

Figure 4:
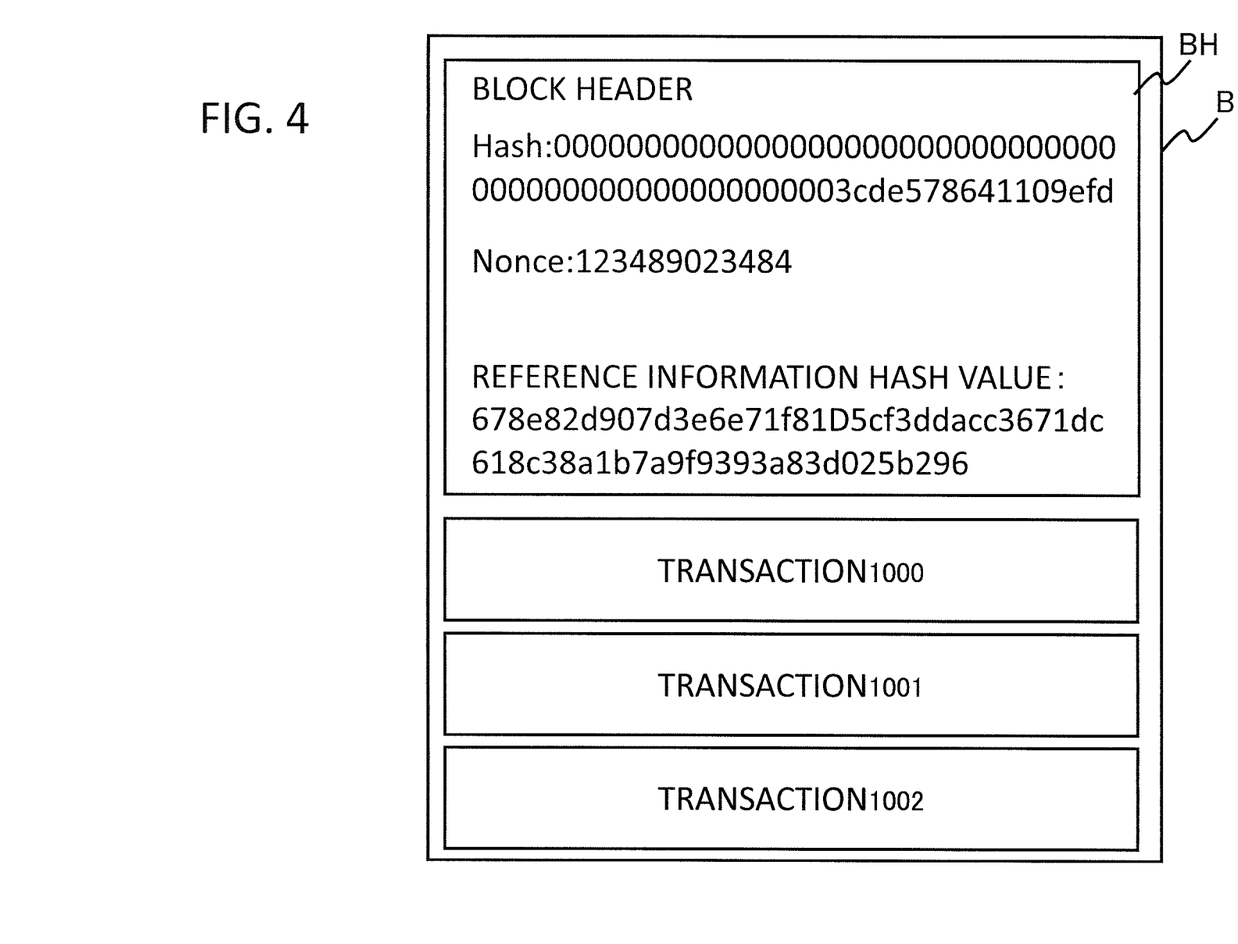
FIG. 4 is a diagram showing an example of a block created by a blockchain management apparatus in the first exemplary embodiment of the disclosure.

The block receiving part 110 receives a block B transmitted to a blockchain network. The block B, as shown in FIG. 4, is configured by adding a block header BH to one or a plurality of transactions. Furthermore, the block header BH includes a block header hash value (Hash of FIG. 4) that summarizes a block header included in the immediately preceding block, and at least one reference information hash value (referred to below as "reference information hash value") generated based on reference information that is partial information in a ledger designated by a specific rule. It is to be noted that a case is also included where the reference information relates to plural portions in a ledger. In this case, there are plural reference information items, and one or a plurality of reference information hash values are generated from these plural reference information items.

The block verification part 120 is provided with a reference information verification part 121 and a reference information determination part 122, and verifies that a received block is correctly generated. Specifically, the reference information determination part 122 uses a determination rule (prescribed rule) to determine reference information that is partial information in a ledger based on some or all information of the ledger. The reference information verification part 121 verifies that a reference information hash value is generated based on the reference information. Here, a determination rule means a rule where all blockchain management apparatuses 100 can identify reference information that is the same partial information, from information of a ledger.

The consensus formation part 130 implements a consensus formation procedure, with other blockchain management apparatuses, to form consensus regarding whether or not to store, in a case where the received block is judged to be correctly generated by the block verification part 120.

The ledger storage part 140 stores some or all of a ledger that is an aggregation of all blocks for which consensus has been formed by the consensus formation part 130.

Next, a detailed description is given concerning operations of a blockchain management apparatus 100, making reference to the drawings. First, referring to FIG. 5 a description is given of a series of operations in which the blockchain management apparatus 100 verifies a received block, up to storing in the ledger storage part 140.

Figure 5:
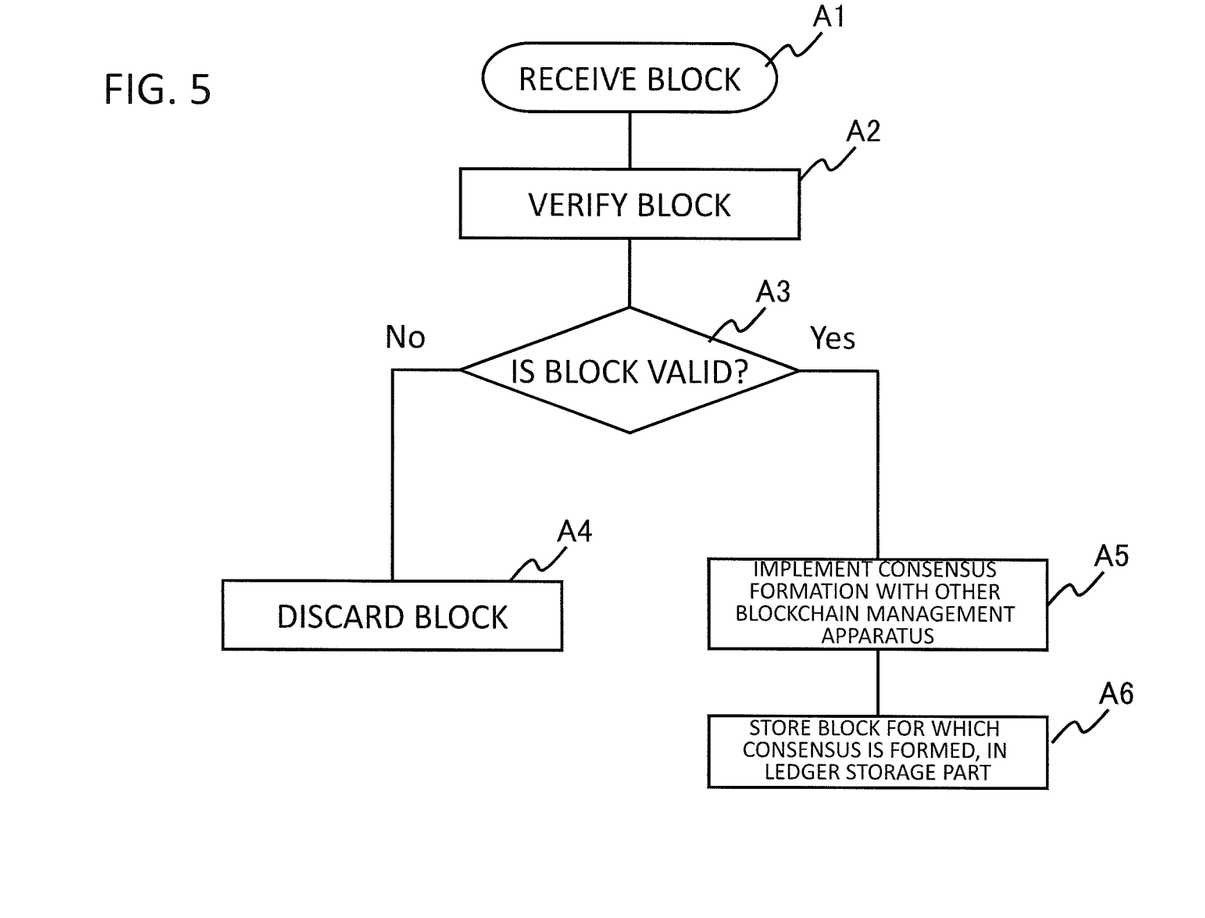
FIG. 5 is a flow chart representing operations of the blockchain management apparatus in the first exemplary embodiment of the disclosure.

The block receiving part 110 receives a block from another blockchain management apparatus 100 or the like (step A1). Here, the block B shown in FIG. 4 is received. As shown in FIG. 4, the block B has a configuration in which a block header that includes: a block header hash value that summarizes a block header of the immediately preceding block, a value known as Nonce used by the consensus formation part 130, and a reference information hash value, in a body that is an aggregation of transactions.

Next, the block verification part 120 performs verification of the received block B (step A2). A description is given later concerning content of this verification using the flowchart of FIG. 7.

As a result of the verification, in a case where it is judged that the block has not been correctly generated (No in step A3), the blockchain management apparatus 100 disposes of the block (step A4).

Meanwhile, in a case of a judgment being made that a block has been correctly generated (Yes in step A3), the consensus formation part 130 performs consensus formation with other blockchain management apparatuses 100 (step A5). A description is given later concerning a method of the consensus formation, using the flowchart of FIG. 8.

Figure 6:
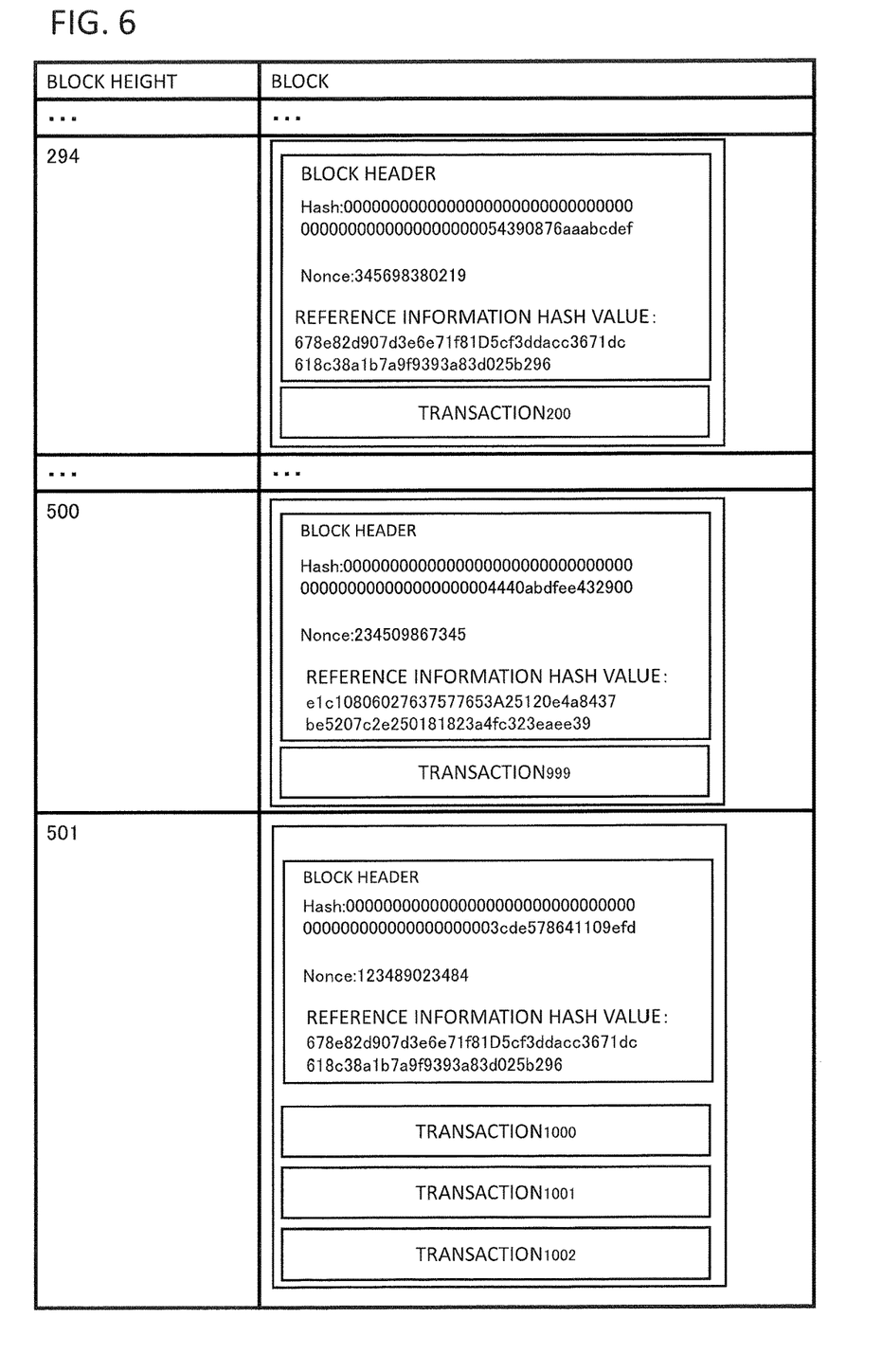
FIG. 6 is a diagram showing an example of ledger data held in a ledger storage part of the blockchain management apparatus in the first exemplary embodiment of the disclosure.

Finally, the blockchain management apparatus 100 stores the block for which consensus has been formed with other blockchain management apparatuses 100 in the ledger storage part 140. FIG. 6 is a diagram showing an example of ledger data held in the ledger storage part 140. In the example of FIG. 6 the result of the consensus formation shows a state in which a block with block height 501 is added. It is to be noted that the storage state of the ledger in the ledger storage part 140 is not limited to the example shown in FIG. 6, and various modifications may be added. For example, the example of FIG. 6 has a configuration associating the height of the block and the main unit of the block, but the configuration is not limited to this form.

Figure 7:
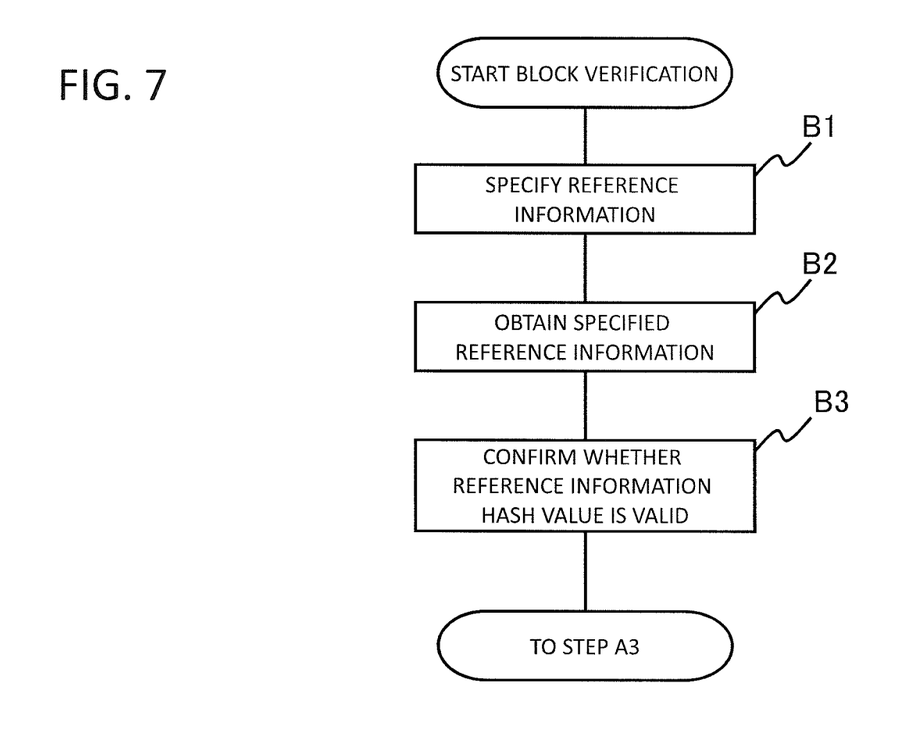
FIG. 7 is a flow chart representing operations (block verification) of the blockchain management apparatus in the first exemplary embodiment of the disclosure.

Continuing, a detailed description is given concerning verification processing of a block by the block verification part 120 in step A2 of the abovementioned FIG. 5, using the flowchart of FIG. 7. In the description below, the blockchain management apparatus 100 receives the block shown in FIG. 4.

When the block to be verified is inputted, first the reference information determination part 122 of the block verification part 120 generates at least one identifier that can identify partial information in the ledger, in accordance with a determination rule, to be identified as reference information (step B1).

The height of the block, for example, may be used for the identifier of the reference information. The following may be used, for example, for the rule (determination rule) that specifies reference information.

a hexadecimal numerical value is created using a hash function such as SHA-256 for a part of the immediately preceding block (Nonce value, or hash value of immediately preceding block, or the like).

an addition of 1 is made to a value obtained by performing a remainder operation with the height of the latest block on a portion (lower digits) of the numerical value.

By using the abovementioned rule, it is possible to determine what height block to specify as reference information among block heights 1 to the current one.

For example, a hash value is taken with a SHA-256 hash function for a hash value of the immediately preceding block included in a block of height 500 that is the immediately preceding block in the ledger shown in FIG. 6 (that is, a hash value of a block header of height 499). Here, a value of "9a796cbfa5cc884d7f3e7ddf6c743dfeb9a78e876766d324-3e893e4ded4e638d" is obtained as the hash value. A block referenced by adding +1 after getting the remainder with the current block height of 500 with respect to the least significant 16 digits of the hexadecimal number: "3e893e4ded4e638d", is "294".

It is to be noted that there is no limitation to the identifier of the reference information or determination method thereof. For example, the identifier of the reference information may be configured from plural information items such as block height and number to identify a transaction in the block. The identifier configured by these information items may be obtained from plural partial information items of an immediately preceding block, or may be respectively generated from a plurality of immediately preceding blocks. There may be a plurality of identifiers of the reference information, and plural reference information items may be specified.

With regard to an identifier for selecting reference information in this way, any form is possible, if there is an incentive operating with regard to more ledger data being held for a longer period, and if there is information by which reference information can be identified from within the ledger. If the identifier for reference information is a determination rule, and partial information in the ledger is selected to some extent uniformly, there is no limitation with regard to the determination method thereof.

Next, the reference information verification part 121 obtains one or a plurality of reference information items, based on an identifier of one or a plurality of reference information items determined by the reference information determination part 122 from the ledger. Here, a block with block height 294 is obtained as reference information from the ledger shown in FIG. 6.

Next, the reference information verification part 121 verifies that at least one reference information hash value included in the received block is generated based on the reference information, and returns a verification result of success or failure (step B3). Here, verification is performed as to whether or not a hash value, calculated by a hash function such as SHA-256 or the like with respect to reference information that is a block of height 294 shown in FIG. 6 in step B2, matches a reference information hash value included in the block of FIG. 4. In a case where the hash value of the block of height 294 that is the reference information is "678e82d907d3e6e71f81D5cf3ddacc3671-dc618c38a1b7a9f9393a83d025b296" it is judged to match the reference information hash value "678e82d907d3e6-e71f81D5cf3ddacc3671dc618c38a1b7a9f9393a83d025b2-96" included in the block of FIG. 4.

It is to be noted that in a case where there are a plurality of reference information items, by linkage thereof, one reference information hash value may be verified, or verification may be performed with reference information corresponding to each of the plurality of reference information hash values. The verification method is not limited to the above method, and it is sufficient if it is possible to perform verification if the reference information hash value is generated from the reference information.

Continuing, a detailed description is given concerning consensus formation processing by the consensus formation part 130 in step A5 of the abovementioned FIG. 5. It is to be noted that the following is a description of consensus formation by a mechanism called Proof of Work which is used in Bitcoin as an example, but other consensus methods are also possible and there is no limitation with regard to method of consensus formation.

Figure 8:
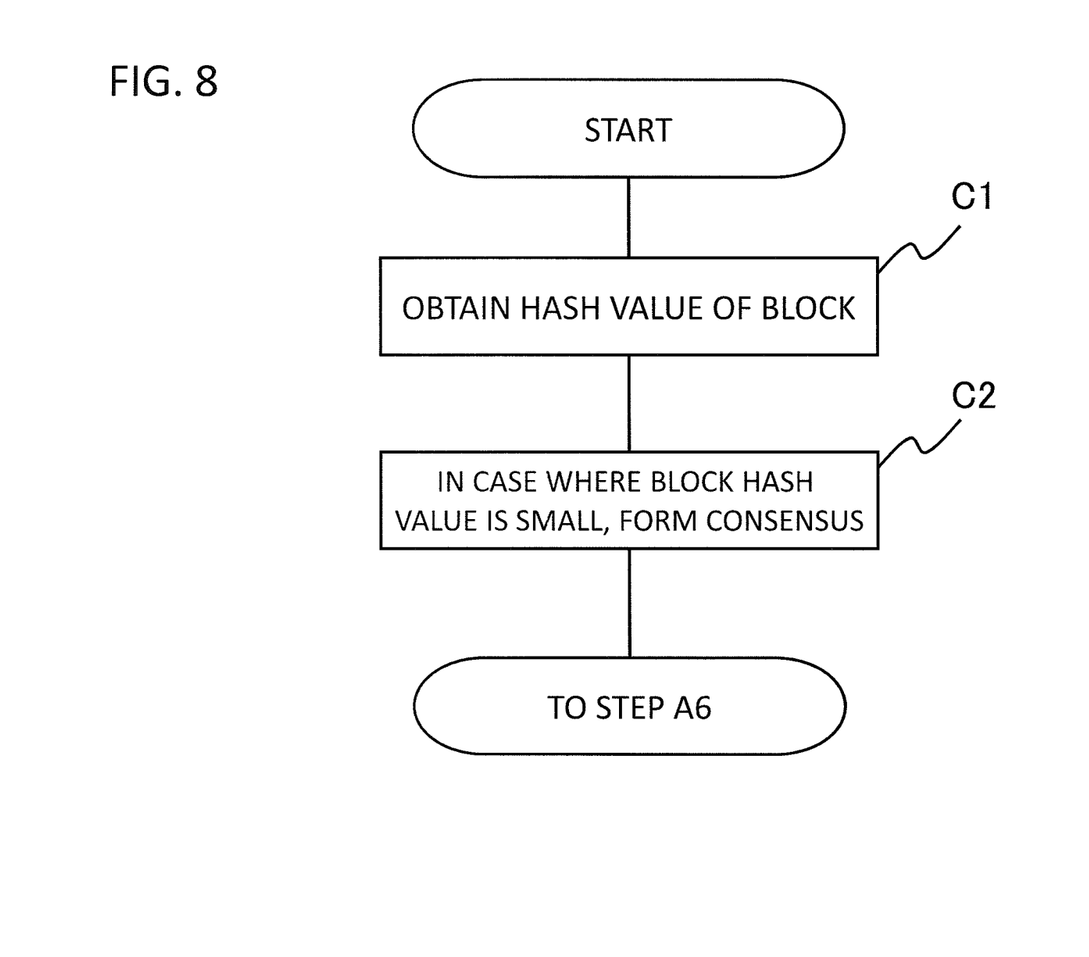
FIG. 8 is a flow chart representing operations (consensus formation) of the blockchain management apparatus in the first exemplary embodiment of the disclosure.

Referring to FIG. 8, first the consensus formation part 130 obtains a hash value of a block (step C1). The hash value may be obtained for an entire block, or may be obtained for a value that summarizes a feature of the block. Here, the description is such that a value of "0000000000000000-00000000000000000000000000000002bcad85e7b40d3-a4" in hexadecimal is obtained as the hash value of the block shown in FIG. 4.

Finally, the consensus formation part 130 judges whether or not the hash value of the block is smaller than a target value, and in a case where the hash value of the block is small, judges that consensus has been formed (step C2). Here, for the target value a unique value may be determined in advance in a system, or it may be generated by calculation referring to a former block. Here, in a case where the target value for the block shown in FIG. 4 is "0000000-000000000000000000000000000000000000000100000-0000000000 0", since the hash value of the block of FIG. 4 described above is less than the target value in question, consensus is judged to have been formed.

This type of consensus formation method is known as Proof of Work; when a block is generated, a value known as Nonce as shown in the block of FIG. 4 is changed, and a block is generated such that a hash value of the block is smaller than the target value. Since it is not possible to reverse calculate Nonce from the hash value, the blockchain management apparatus 100 must test Nonce by brute force. Therefore, a certain calculation cost and time are required in generating a block. The time required for block generation can be controlled by the target value; for example, in Bitcoin, from the generation interval for the most recent few blocks, adjustment is performed such that henceforth the time required in generating a block is of the order of 10 minutes. The consensus formation means 130 that uses Proof of Work can verify whether or not a block is generated with calculation cost, by the hash value of the block. The majority of blockchain management apparatuses 100 participating in a blockchain network verify a hash value of a block in accordance with the same rule, and by having only blocks that pass verification as blocks stored in the ledger storage means 140, it is possible to form consensus in the entire network.

As described above, according to the blockchain management apparatus 100 of the present exemplary embodiment, it is possible to have an incentive operate with regard to holding a transaction, and more transactions are held in the blockchain management apparatus 100.

A reason for this is that, in block verification by the block verification part 120, the configuration is such that nodes holding more transactions obtain an incentive. Specifically, the reference information verification part 121 of the block verification part 120 judges a block to be correct only in a case where a hash value of reference information included in a block is verified to be generated from reference information that is partial information in a ledger determined by a determination rule. The consensus formation part 130 performs consensus formation with other blockchain management apparatuses 100, and the block for which consensus has been formed is stored in the ledger storage part 140. As a result, the blockchain management apparatus 100 must access arbitrary partial information in the ledger in order to generate the block recorded in the ledger. In order to maximize the incentive according to block generation, it is better to have fewer nodes that can generate a block, so that it is difficult to obtain reference information from other nodes, and each blockchain management apparatus 100 must hold more of preferably all information in a ledger. Therefore, more of all transactions are held for longer.

Second Exemplary Embodiment

In the abovementioned exemplary embodiment a mechanism in which a blockchain management apparatus 100 receives a transaction from a transaction issuer to generate a block is omitted, but the blockchain management apparatus 100 may also be provided with such a function. For example, as in FIG. 9 the blockchain management apparatus 100C may be provided with a transaction receiving part 150 and a block generation part 160 (Second Exemplary Embodiment).

Figure 9:
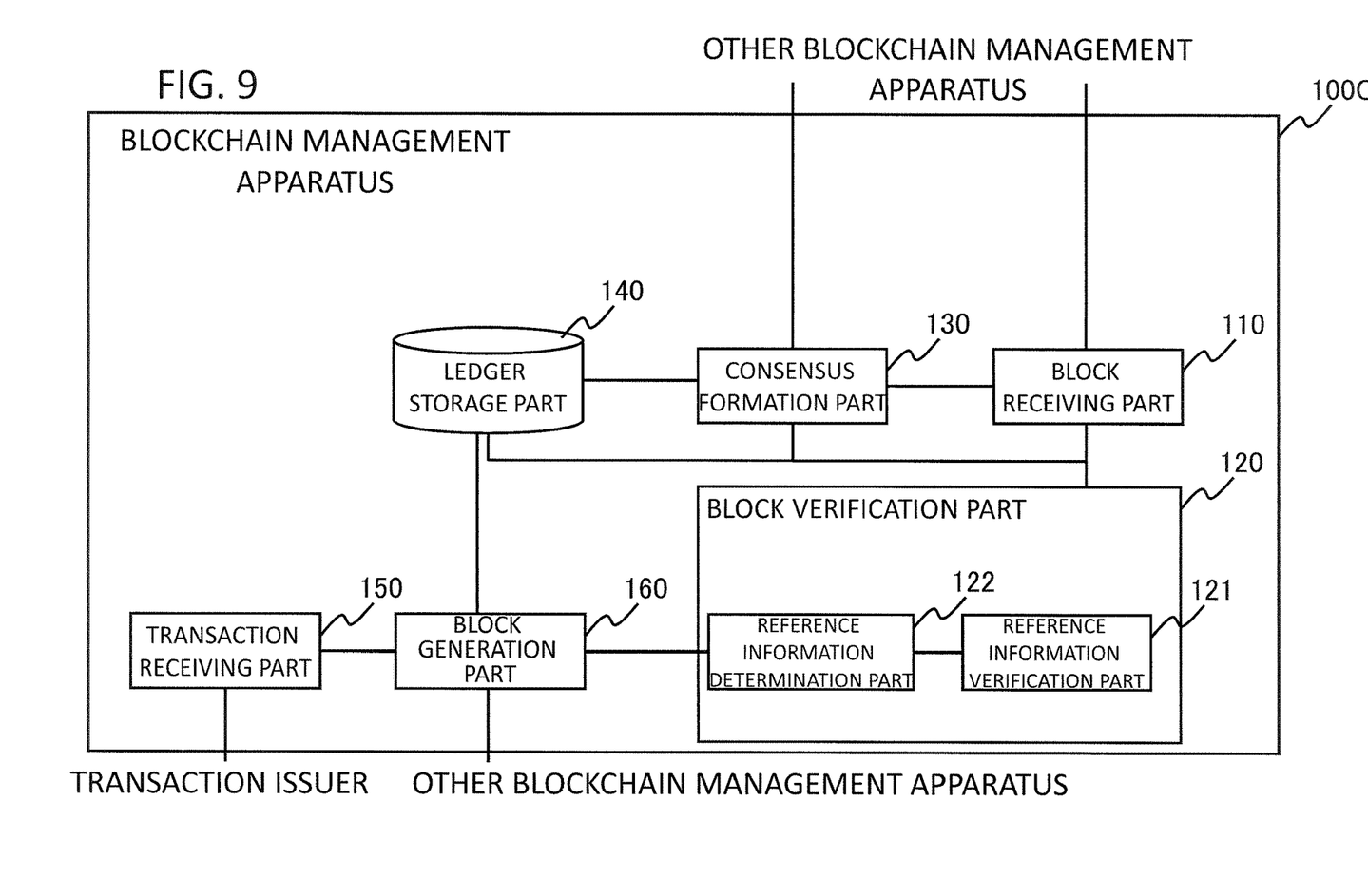
FIG. 9 is a functional block diagram showing a configuration of a blockchain management apparatus in a second exemplary embodiment of the disclosure.
Figure 10:
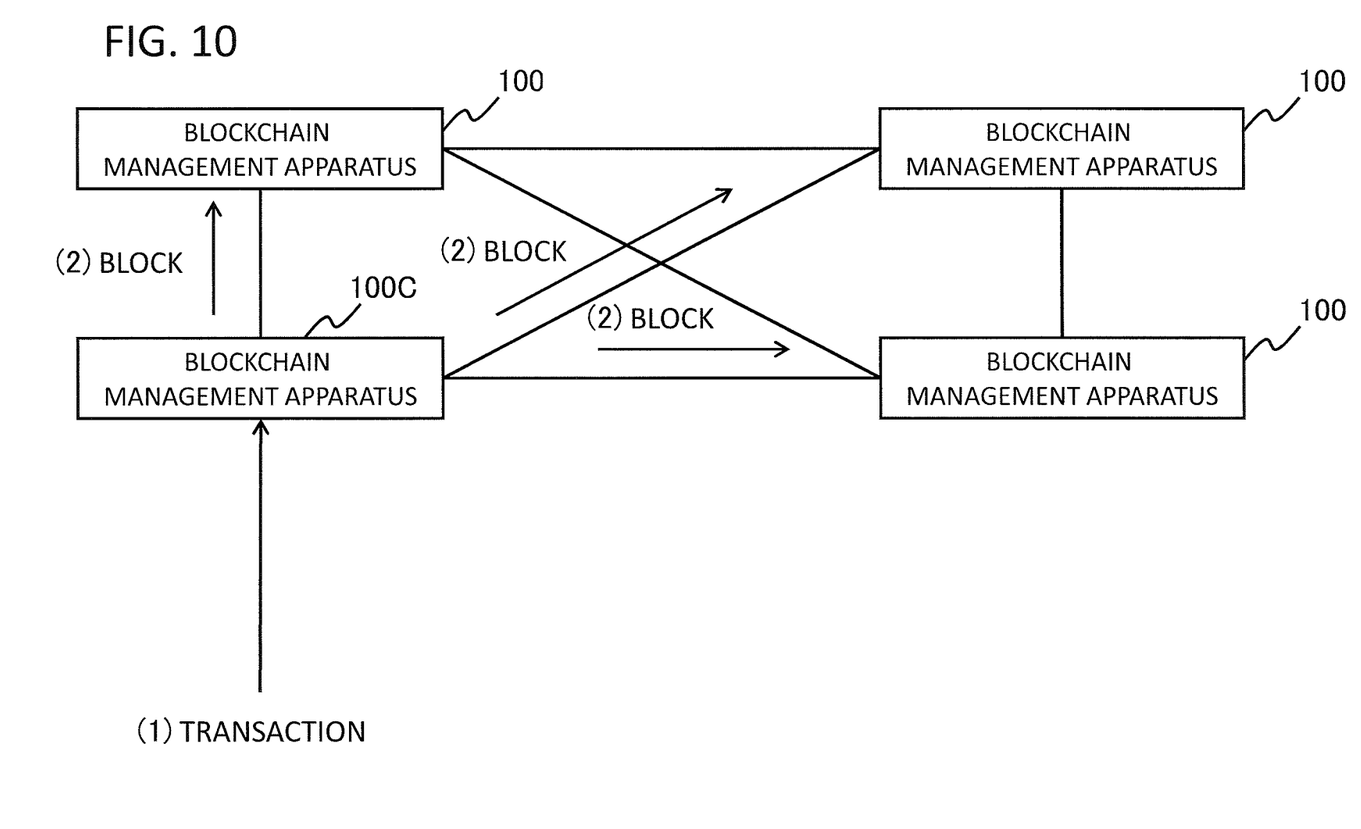
FIG. 10 is a diagram showing typical operations in the second exemplary embodiment of the present disclosure.

The transaction receiving part 150 receives a transaction from the transaction issuer or another blockchain management apparatus 100 (refer to (1) in FIG. 10). The block generation part 160 collects a hash value of the immediately preceding block stored in the a ledger storage part 140, a reference information hash value summarizing reference information determined by a reference information determination part 122, and one or more received transactions, to generate a block, and distributes to other blockchain management apparatuses 100 ((2) in FIG. 10). In order to form consensus by the abovementioned Proof of Work, the block generated by this block generation part 160 is preferably a block that satisfies a fixed condition (namely, a block including a hash value of reference information selected using a determination rule).

As described above, the present disclosure may also be applied to a blockchain management apparatus 100 provided with a function receive a transaction and generate a block.

A description has been given above of respective exemplary embodiments of the present disclosure, but the present disclosure is not limited to the abovementioned exemplary embodiments, and further modifications, substitutions and adjustments may be added within a scope that does not depart from fundamental technical concepts of the disclosure. For example, representative forms of network configurations, respective element configurations, ledgers, blocks and the like, shown in the respective drawings are examples for the purpose of aiding understanding of the disclosure, and are not intended to limit the disclosure to configurations illustrated in the drawings.

For example, the respective parts (processing means) of the blockchain management apparatuses shown in FIG. 1, FIG. 3 and FIG. 9 can be implemented by a computer program that executes the abovementioned respective processing in a processor installed in a blockchain management apparatus, using hardware thereof.

Finally, preferred modes of the present disclosure are summarized.

[First Mode]

(Refer to the blockchain management apparatus according to the first aspect described above.)

[Second Mode]

As the predetermined rule, a rule may be used that determines the reference information by using all or some information of one or a plurality of most recent blocks.

[Third Mode]

The predetermined rule may be a rule that calculates one or a plurality of identifiers that identify partial information in the ledger with some or all the information in the ledger as input, and extracts one or a plurality of items of the reference information based on one or a plurality of identifiers from the ledger.

[Fourth Mode]

The height of height of one or a plurality of blocks may be used as an identifier that identifies partial information in the abovementioned ledger.

[Fifth Mode]

Information may be used that identifies the height of one or a plurality of blocks and a transaction, as identifiers that identify partial information in the abovementioned ledger.

[Sixth Mode]

The identifier is preferably determined by a range of heights of the latest blocks stored in the ledger from 0.

[Seventh Mode]

The blockchain management apparatus may be further provided with: a transaction receiving part that receives a transaction from another apparatus, and a block generating part that generates a block by collecting a hash value calculated from the latest block stored in the ledger storage part, and one or more transactions received by the transaction receiving part.

[Eighth Mode]

The block generating part of the abovementioned blockchain management apparatus may have a configuration that generates a block such that the hash value calculated by a predetermined rule from the block is compared with a predetermined target value to satisfy a predetermined condition.

[Ninth Mode]

(Refer to the blockchain management method according to the second aspect described above.)

[Tenth Mode]

(Refer to the computer program according to the third aspect described above.)

It is to be noted that the eighth and ninth modes described above may be expanded with regard to the second to seventh modes, similar to the first mode.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present disclosure, and also based on fundamental technological concepts thereof. Various combinations and selections of various disclosed elements (including respective elements of the respective claims, respective elements of the respective exemplary embodiments and examples, respective elements of the respective drawings and the like) are possible within the scope of the disclosure of the present disclosure. That is, the present disclosure clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 100, 100A to 100C blockchain management apparatus
101, 110 block receiving part
102, 120 block verification part
103, 130 consensus formation part
104, 140 ledger storage part
121 reference information verification part
122 reference information determination part
150 transaction receiving part
160 block generation part
B block
BH block header

What is claimed is:

1. A blockchain management apparatus comprising:
at least a processor; and
a memory in circuit communication with the processor,
wherein the processor is configured to execute program instructions stored in the memory to implement:
a block receiving part configured to receive a block including a block header that includes at least one hash value for reference information that is selected from a predetermined range in a ledger based on a predetermined rule established between blockchain management apparatuses;
a block verification part configured to select reference information that is partial information in the ledger based on the predetermined rule and determines whether or not the hash value for the reference information included in the block has been generated based on the reference information, in order to verify that the block has been correctly generated;
a consensus formation part configured to form a consensus with other blockchain management apparatuses in order to write the block to the ledger, if the block verification part verifies that the block has been correctly generated; and
a ledger storage part configured to store the block for which the consensus has been formed,
wherein the predetermined rule is a rule that, with some or all the information in the ledger as input, calculates one or a plurality of identifiers that identify partial information in the ledger, and extracts one or a plurality of items of reference information based on the one or the plurality of identifiers from the ledger.

2. The blockchain management apparatus according to claim 1, using, as the predetermined rule, a rule that determines the reference information by using all or some information of one or a plurality of most recent blocks.

3. The blockchain management apparatus according to claim 2, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

4. The blockchain management apparatus according to claim 1, using, as an identifier that identifies partial information in the ledger, height of one or a plurality of blocks,
wherein the height of the block indicates the number of blocks preceding the block in the blockchain.

5. The blockchain management apparatus according to claim 4, wherein the identifier is determined by a range of the height of the latest block stored in the ledger from 0.

6. The blockchain management apparatus according to claim 5, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

7. The blockchain management apparatus according to claim 4, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

8. The blockchain management apparatus according to claim 1, using, as an identifier that identifies partial information in the ledger, information that identifies height and transaction of one or a plurality of blocks,
wherein the height of the block indicates the number of blocks preceding the block in the blockchain.

9. The blockchain management apparatus according to claim 8, wherein the identifier is determined by a range of the height of the latest block stored in the ledger from 0.

10. The blockchain management apparatus according to claim 9, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

11. The blockchain management apparatus according to claim 8, wherein the processor is configured to execute the program instructions to implement:
a transaction receiving part configured to receive a transaction from another apparatus; and a block generating part configured to generate a block by collecting one or more transactions received by the transaction receiving part and a hash value calculated from the latest block stored in the ledger storage part.

12. The blockchain management apparatus according to claim 1, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

13. The blockchain management apparatus according to claim 12, wherein the block generating part generates a block such that a hash value calculated by a predetermined rule from the block is compared with a predetermined target value to satisfy a predetermined condition.

14. The blockchain management apparatus according to claim 1, wherein the processor is configured to execute the program instructions to implement:
a transaction receiving part configured to receive a transaction from another apparatus; and
a block generating part configured to generate a block by collecting one or more transactions received by the transaction receiving part and a hash value calculated from the latest block stored in the ledger storage part.

15. A blockchain management method, comprising:
receiving a block including a block header that includes at least one hash value for reference information that is selected based on a predetermined rule from a predetermined range in a ledger;
selecting reference information that is partial information based on the predetermined rule in the ledger and determining whether or not the hash value for the reference information included in the block has been generated based on the reference information, in order to verify that the block has been correctly generated;
forming consensus, if the verification verifies that the block has been correctly generated, with other blockchain management apparatuses in order to write the block to the ledger; and
storing the block for which the consensus has been formed,
wherein the predetermined rule is a rule that, with some or all the information in the ledger as input, calculates one or a plurality of identifiers that identify partial information in the ledger, and extracts one or a plurality of items of reference information based on the one or the plurality of identifiers from the ledger.

16. A non-transitory computer-readable storage medium that records a program that causes a computer configuring a blockchain management apparatus to execute processing of:
receiving a block including a block header that includes at least one hash value for reference information that is selected based on a predetermined rule from a predetermined range in a ledger;
selecting reference information that is partial information based on the predetermined rule in the ledger and determining whether or not the hash value for the reference information included in the block has been generated based on the reference information, in order to verify that the block has been correctly generated;
forming consensus, if the verification verifies that the block has been correctly generated, with other blockchain management apparatuses in order to write the block to the ledger; and
storing the block for which the consensus has been formed,
wherein the predetermined rule is a rule that, with some or all the information in the ledger as input, calculates one or a plurality of identifiers that identify partial information in the ledger, and extracts one or a plurality of items of reference information based on the one or the plurality of identifiers from the ledger.

* * * * *